(12) United States Patent
Fresko et al.

(10) Patent No.: US 7,853,628 B1
(45) Date of Patent: Dec. 14, 2010

(54) SELECTIVE PROMOTION POLICY FOR GENERATIONAL GARBAGE COLLECTORS

(75) Inventors: Nedim Fresko, San Francisco, CA (US); Bernd J. Mathiske, Cupertino, CA (US); Oleg Pliss, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1027 days.

(21) Appl. No.: 10/821,468

(22) Filed: Apr. 9, 2004

(51) Int. Cl.
*G06F 12/00* (2006.01)
*G06F 17/30* (2006.01)
(52) U.S. Cl. ...................................... 707/819
(58) Field of Classification Search ........................ None
See application file for complete search history.

(56) References Cited

U.S. PATENT DOCUMENTS

| | | | |
|---|---|---|---|
| 5,857,210 A * | 1/1999 | Tremblay et al. | 707/206 |
| 6,490,599 B2 * | 12/2002 | Kolodner et al. | 1/1 |
| 6,493,730 B1 * | 12/2002 | Lewis et al. | 707/206 |
| 6,839,725 B2 * | 1/2005 | Agesen et al. | 707/206 |
| 7,024,437 B2 * | 4/2006 | Garthwaite | 707/206 |
| 2003/0187888 A1 * | 10/2003 | Hayward | 707/206 |
| 2003/0212719 A1 * | 11/2003 | Yasuda et al. | 707/206 |
| 2004/0167945 A1 * | 8/2004 | Garthwaite | 707/206 |
| 2005/0138623 A1 * | 6/2005 | Fresko | 718/102 |
| 2005/0149585 A1 * | 7/2005 | Bacon et al. | 707/205 |

OTHER PUBLICATIONS

Ken Gottry, "Pick up performance with generational garbage collection—Use the appropriate Java HotSpot VM 1.3.1 parameters to improve throughput," Java World, Jan. 11, 2002, pp. 1-14, http://www.javaworld.com/javaworld/jw-01-2002/jw-0111-hotsportgc_p.html.
U.S. Appl. No. 11/023,029, filed Dec. 23, 2004.

* cited by examiner

*Primary Examiner*—Michael J Hicks
(74) *Attorney, Agent, or Firm*—Marsh Fischmann & Breyfogle LLP; Kent A. Lembke; R. Mahboubian (57) ABSTRACT

Techniques for selectively promoting objects in a generational garbage collector are provided. Rather than using a single promotion policy, information about objects are used to determine and effectively enforce a suitable promotion policy for them. This information, for example, may be information about the general context under which the object is allocated or executed, or it may pertain to a particular operation, thread, function (or method) where garbage is likely to be generated and/or mostly garbage is generated. When it is determined that garbage is likely to be generated or mostly garbage is to be generated, a more suitable promotion policy can be enforced rather than a general (or normal). Objects are allocated using two or more memory allocators. Typically, objects that are likely to be garbage are allocated in a manner that effectively delays or bars their promotion to the next generation.

31 Claims, 5 Drawing Sheets

SELECTIVE PROMOTION POLICY FOR GENERATIONAL GARBAGE COLLECTORS

CROSS-REFERENCE TO RELATED APPLICATIONS

This invention is related to U.S. Provisional Patent Application No. 60/532,460, filed on Dec. 24, 2003, and entitled: "SMART GARBAGE COLLECTION FOR COMPUTING ENVIRONMENTS". That application is incorporated herein by reference in its entirety and for all purposes.

This invention is related to U.S. Provisional Patent Application No. 60/532,541, filed on Dec. 24, 2003, and entitled: "SMART GARBAGE COLLECTION FOR COMPUTING ENVIRONMENTS". That application is incorporated herein by reference in its entirety and for all purposes.

BACKGROUND

The present invention relates generally to computing systems, and more particularly, to techniques for allocation and garbage collection of objects of an object-oriented programming language.

From a computer programming perspective, data which is no longer needed by a computer program can be referred to as "garbage." In the past, programmers had to write programs that explicitly requested allocation of data and then returned it to the system (e.g., operating system) when it was no longer needed. As such, programs that neglected to return unused storage could have been shut down by the operating system.

Today, some programming languages, such as LISP, and Java™ programming languages, provide a "garbage collector" that frees programmers from concerns about explicitly freeing memory. A garbage collector is useful because it cleans up the memory space by identifying objects that are no longer needed. The memory space can be reclaimed for a more meaningful use. In programming languages such as Java™, a portion of memory is provided as a "heap" for allocation and storage of objects. In a heap, some objects become garbage shortly after their creation, some survive for a long time and then become garbage, and others can remain alive for the entire duration of the program.

A variety of garbage collection schemes can be used to free the memory (e.g., heap) from objects that are no longer used (i.e., have become garbage). Some garbage collection schemes use a "generational" garbage collector. A generational garbage collector divides memory (e.g., a heap) into multiple generations. Typically, the heap is divided into a Young Generation and one or more Older Generations. Objects are initially allocated in the Young Generation. If an object in the Young Generation meets some "promotion" criteria, such as having survived a certain number of collections, then the object is "promoted" to the next generation, namely, an Older Generation, and possibly promoted to the next Older Generation, and so on.

Generally, a generational collector is free to use a different collection strategy for different generations and perform garbage collection on each of the generations separately. Typically, most garbage is collected from the Young Generation. Hence, the garbage collection strategy used in the Young Generation can have a significant amount of influence on overall system performance.

A generational garbage collection scheme is an effective strategy, especially for computing environments that operate with a relatively limited processing power and/or memory (e.g., embedded, handheld, or mobile devices, virtual machine used for smaller devices, etc.). Conventional generational garbage collectors promote all objects in the Young Generation in accordance with a single promotion policy. A single promotion policy, however, typically results in prematurely promoting some objects to the next generation. In other words, some objects are promoted to the next generation even though they become garbage after they have been moved to the next generation.

Accordingly, improved garbage collection strategies are needed.

SUMMARY

As noted in the background section, conventional generational garbage collectors promote all objects in the Young Generation in accordance with a single policy. This results in premature promotion of some objects that become garbage after they have been moved to the next generation.

Prematurely promoting an object has many drawbacks. One drawback is that it is typically more expensive to garbage collect an Older Generation rather than the Young Generation. As a general rule, garbage collection of an Older Generation should be minimized to achieve better system performance. Another drawback of prematurely promoting an object is the unnecessary use of the space reserved for the Older Generations, which in turn, adversely affects performance by increasing the frequency of garbage collection cycles for the Older Generations. In some computing environments (e.g., virtual machines) yet additional resources are needlessly used to promote objects when objects are prematurely promoted. By way of example, more invocations of garbage collection write barriers are needed to track the intergenerational references (or pointers) and/or more scans of the recorded write barrier entries are needed. Accordingly, improved garbage collection strategies are needed.

Broadly speaking, the invention relates to techniques for selectively promoting objects in a generational garbage collector. As will be appreciated, these techniques can improve the performance of computing systems, especially those that operate with a relatively small amount of memory and/or processing power (e.g., embedded or handheld devices, virtual machine used for smaller devices, etc.)

The invention utilizes information about objects to determine and effectively enforce a suitable promotion policy for them. This information, for example, may be information about the general context under which the object is allocated or executed. As another example, the information may be concerning a particular operation, thread, function (or method) where garbage is likely to be generated and/or mostly garbage is likely to be generated. By way of example, operations such as class loading, parsing of classfiles, and dynamic compilation which are performed by system code are likely to generate temporary data or mostly temporary data that is likely to become garbage before the user program terminates. As such, memory allocated by system code can be considered to be likely garbage, or mostly garbage. In addition, some particular functions (or methods) are also likely to generate temporary data or mostly temporary data that is likely to become garbage or be mostly garbage. By way of example, concatenation of strings in the Java™ programming language is an operation that is commonly used and generates temporary data or mostly temporary data that is likely to become garbage, or become mostly garbage.

In accordance with one aspect of the invention, a plurality of promotion policies are determined and effectively enforced to promote objects from the Young Generation to an Older Generation. As a result, each object can be promoted in accordance with a promotion policy that is more suitable for that particular object. In one embodiment, when it is determined that garbage is likely to be generated or mostly garbage is to be generated, a more suitable promotion policy can be enforced rather than a general (or normal) promotion policy for all objects. In other words, the general (or normal) promotion policy can be preempted by a more suitable promotion policy when it is deemed appropriate.

Objects are allocated using two or more memory allocators in accordance with another aspect of the invention. Typically, objects that are likely to be garbage are allocated in a manner that effectively delays or bars their promotion to the next generation. In one embodiment, a preemptive memory allocator is provided. Rather than using a general memory allocator, the preemptive memory allocator can be used to allocate objects that are likely to be garbage. An object can, for example, be allocated with a header that indicates to a generational garbage collector that the promotion of an object to the next generation should be postponed or altogether avoided. Hence, the number of objects that are prematurely promoted is reduced. As a result, system performance is improved, especially when a relatively small amount of memory and/or processing power is used (e.g., embedded or handheld devices, virtual machine used for smaller devices, etc.)

The invention can be implemented in numerous ways, including as a method, a computer system and a computer readable storage medium. Although aspects of methods, systems, and articles of manufacture consistent with the present invention are depicted as being stored in memory, one having skill in the art will appreciate that these aspects may be stored on or read from other computer-readable media, such as computer-readable storage media like secondary storage devices, such as hard disks, floppy disks, CD-ROM, or other forms of ROM, RAM, or NVRAM, either currently known or developed in the future. Several embodiments of the invention are discussed below.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background section, conventional generational garbage collectors promote all objects in accordance with a single promotion policy. This results in prematurely promoting some objects that are likely to become garbage after they have been moved to the next generation. Prematurely promoting an object has many drawbacks. One drawback is that it is typically more expensive to garbage collect an Older Generation rather than the Young Generation. As a general rule, garbage collection of an Older Generation should be minimized to achieve better system performance. Another drawback of prematurely promoting an object is the unnecessary use of the space reserved for the Older Generations, which in turn, adversely affects performance by increasing the frequency of garbage collection cycles for the Older Generations. In some computing environments (e.g., virtual machines) yet additional resources are needlessly used to promote objects when objects are prematurely promoted. By way of example, more invocations of garbage collection write barriers are needed to track the inter-generational references (or pointers) and/or more scans of the recorded write barrier entries are needed. Accordingly, improved garbage collection strategies are needed.

Broadly speaking, the invention relates to techniques for selectively promoting objects in a generational garbage collector. As will be appreciated, these techniques can improve the performance of computing systems, especially those that operate with a relatively small amount of memory and/or processing power (e.g., embedded or handheld devices, virtual machine used for smaller devices, etc.)

The invention utilizes information about objects to determine and effectively enforce a suitable promotion policy for them. This information, for example, may be information about the general context under which the object is allocated or executed. As another example, the information may be concerning a particular operation, thread, function (or method) where garbage is likely to be generated and/or mostly garbage is likely to be generated. By way of example, operations such as class loading, parsing of classfiles, and dynamic compilation which are performed by system code are likely to generate temporary data or mostly temporary data that is likely to become garbage before the user program terminates. As such, memory allocated by system code can be considered to be likely garbage, or mostly garbage. In addition, some particular functions (or methods) are also likely to generate temporary data or mostly temporary data that is likely to become garbage or be mostly garbage. By way of example, concatenation of strings in the Java™ programming language is an operation that is commonly used and generates temporary data or mostly temporary data that is likely to become garbage, or become mostly garbage.

In accordance with one aspect of the invention, a plurality of promotion policies are determined and effectively enforced to promote objects from the Young Generation to an Older Generation. As a result, each object can be promoted in accordance with a promotion policy that is more suitable for that particular object. In one embodiment, when it is determined that garbage is likely to be generated or mostly garbage is to be generated, a more suitable promotion policy can be enforced rather than a general (or normal) promotion policy for all objects. In other words, the general (or normal) promotion policy can be preempted by a more suitable promotion policy when it is deemed appropriate.

Objects are allocated using two or more memory allocators in accordance with another aspect of the invention. Typically, objects that are likely to be garbage are allocated in a manner that effectively delays or bars their promotion to the next generation. In one embodiment, a preemptive memory allocator is provided. Rather than using a general memory allocator, the preemptive memory allocator can be used to allocate objects that are likely to be garbage. An object can, for example, be allocated with a header that indicates to a generational garbage collector that the promotion of an object to the next generation should be postponed or altogether avoided. Hence, the number of objects that are prematurely promoted is reduced. As a result, system performance is improved, especially when a relatively small amount of memory and/or processing power is used (e.g., embedded or handheld devices, virtual machine used for smaller devices, etc.)

Embodiments of the invention are discussed below with reference to FIGS. 1-5. However, those skilled in the art will readily appreciate that the detailed description given herein with respect to these figures is for explanatory purposes only as the invention extends beyond these limited embodiments.

Figure 1:
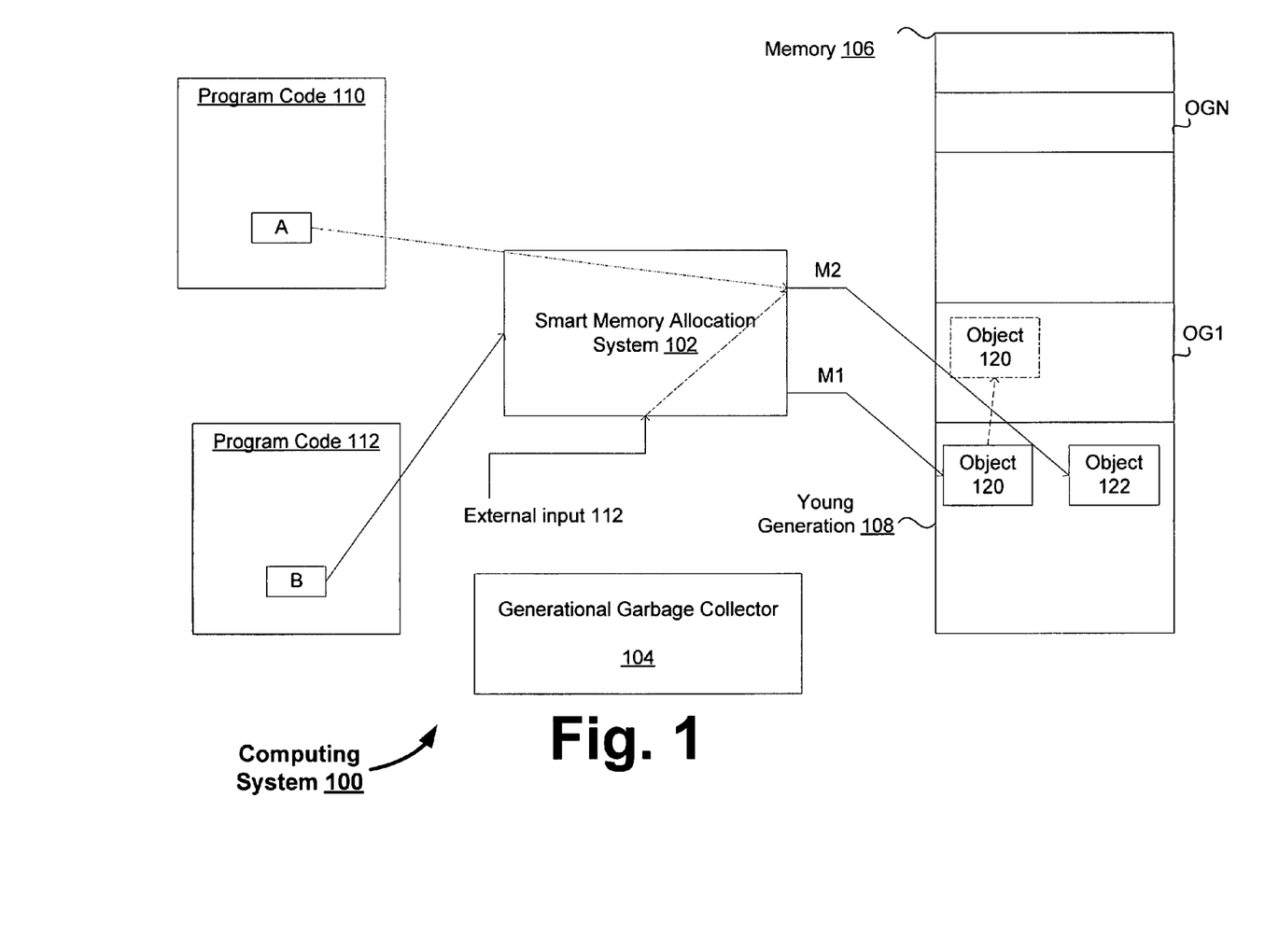
FIG. 1 illustrates a computing system in accordance with one embodiment of the invention.

FIG. 1 illustrates a computing system 100 in accordance with one embodiment of the invention. As shown in FIG. 1, the computing system 100 includes a smart memory allocation system 102, a generational garbage collector 104, and memory 106. As such, the computing system 100 can be implemented in any computing environment that provides a generational garbage collector, memory, and at least one processor (not shown). By way of example, the computing system 100 can be implemented as a virtual machine, personal computer, multi-processor server, a handheld, embedded, or mobile computing device (e.g., mobile phone, or personal digital assistant).

The memory 106 can, for example, represent heap memory used for allocation of objects of an object-oriented programming language (e.g., Java™ programming language. It should be noted that the garbage collector 104 is a generational garbage collector. As such, memory 106 is partitioned into a Young Generation portion 108 and one or more Older Generations $OG_1, \ldots, OG_n$. New objects are initially allocated by the smart memory allocation system 102 in the Young Generation 108 of the memory 106. Some of the new objects allocated by the smart memory allocation system 102 in the Young Generation 108 may eventually be "promoted" to an Older Generation if they still remain in use ("alive") when a garbage collection threshold (or promotion threshold) is reached. This garbage collection threshold (or promotion threshold) can, for example, be based on the number of garbage collection cycles that an object has survived. As will be appreciated, unlike conventional garbage collection schemes, promotion of objects from the Young Generation 108 to an Older Generation (e.g., $OG_1$) may be selectively controlled. In other words, promotion may be delayed, avoided, or even expedited relative to a general threshold ("normal threshold") used to generally promote objects. By way of example, promotion of an object may be delayed beyond a normal promotion threshold, delayed relative to another object, effectively delayed indefinitely, or accelerated.

As will be appreciated, the smart memory allocation system 102 can selectively delay or expedite promotion of an object to the next generation. Referring to FIG. 1, the smart memory allocation system 102 provides two modes of allocation, namely mode M1 and mode M2. Mode M1 can be considered a "normal" (or general) mode of allocation where objects are allocated in the Young Generation 108 so that they will be promoted in accordance with a normal threshold (e.g., surviving a number of garbage collection cycles). Mode M2, however, represents a "preemption" mode where objects are allocated in the Young Generation 108 in accordance with a policy that preempts the normal promotion policy. In other words, when the smart allocation system 102 uses mode M2 to allocate an object in the Young Generation 108, that normal promotion policy will not be enforced for these objects. Instead, these objects will be promoted in accordance with a policy that is considered to be a better promotion policy for that object. As such, allocation mode M2 (preemption mode) effectively preempts the normal promotion policy that is enforced for objects allocated under mode M1 (normal mode). Typically, the preemption policy enforced under allocation mode M2 delays or avoids promotion of an object beyond the normal promotion threshold. As will be appreciated, it is desirable to delay promotion of an object that is likely to become garbage within an acceptable time frame (e.g., before there is a need to expand the Young Generation). However, it should be noted that it is possible to use M2 (or another mode M3) to allocate an object that is effectively promoted to the next generation before the normal promotion threshold. This object may, for example, represent an object that is likely to be used well beyond the normal promotion threshold (e.g., permanent or long-lived objects).

Figure 3A:
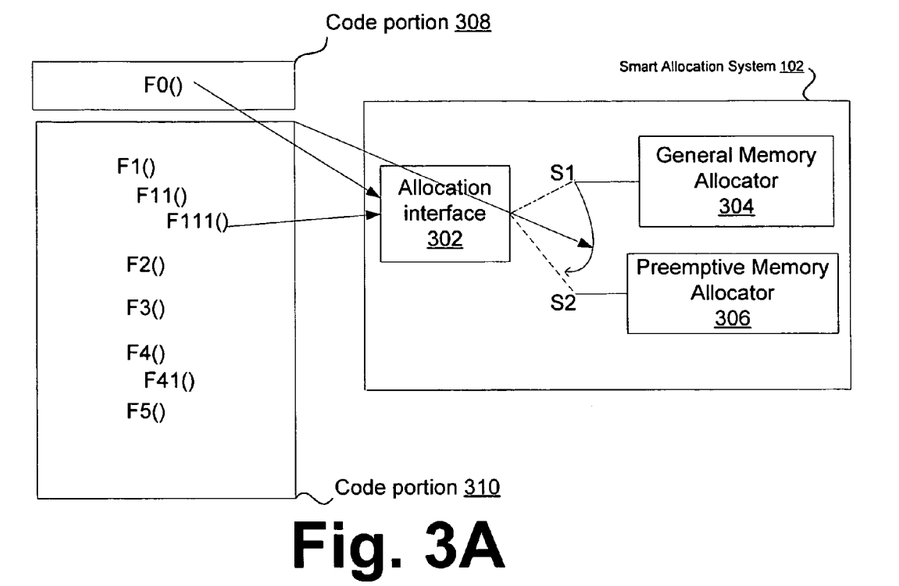
FIG. 3A depicts a smart allocation system in accordance with one embodiment of the invention.

As illustrated in FIG. 1, a component A of a computer code 110 (e.g., a method) may directly specify a particular mode of allocation. For example, component A may make a direct call to an allocation function M2 of the smart allocation system 102 to allocate objects in the preemption mode M2 or normal mode M1. On the other hand, various allocation modes (e.g., M1, M2) of the smart allocation system 102 can also be activated based on external input 112 to effectively switch back and forth between the normal mode M1 and preemption mode M2. This allows a particular mode to be selected for the entire computer code 112 or for a particular context that executes the computer code 112. As a result, memory will be allocated for a component B (e.g., method) of a computer code 112 without requiring the component B to directly specify a mode of allocation or know about how the memory will be allocated. This will be further illustrated in FIG. 3.

In any case, the smart allocation system 102 can allocate objects using a general (normal) mode M1 or a preemption mode M2. By way of example, an object 120 is allocated by the smart allocation system 102 in the Young Generation 108 using the normal mode M1. Object 120 may be promoted to an Older Generation $OG_1$ in accordance with a general (or normal) promotion policy that indicates that any object in the Young Generation 108 that may still be used (alive) after N (e.g., four (4)) garbage collection cycles will be promoted to the next generation. As such, object 120 will be promoted to the next generation, namely, Older Generation 1 ($OG_1$) if it is still alive after N (e.g., four (4)) garbage collection cycles. Object 122, however, is allocated by the smart allocation system 102 in the Young Generation 108 using the preemption mode M2. As such, object 122 may not be promoted to the next generation even if it is still alive after N (e.g., four (4)) garbage collection cycles. In other words, object 122 is promoted in accordance with another policy that preempts the general promotion policy enforced for object 120. In one embodiment, object 122 is marked with a preemption policy indicator (or marking) which indicates that a general promotion policy should not be enforced for the object and/or indicates a particular promotion policy that should be enforced for this object.

Figure 2A:
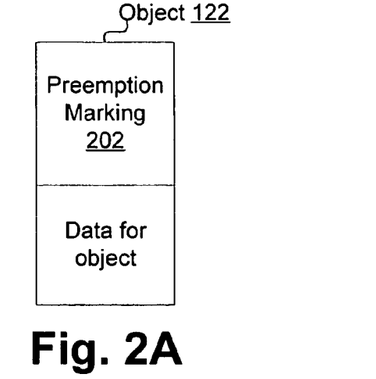
FIGS. 2A-E depict preemption marking in accordance with various embodiments of the invention.
Figure 2B:
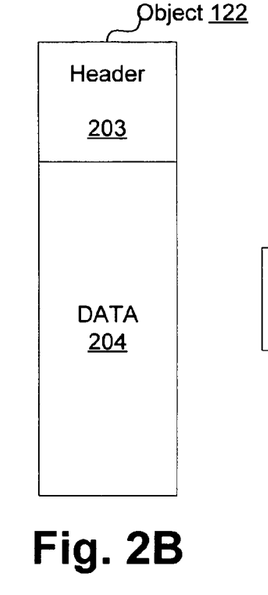

Referring now to FIG. 2A, object 122 is depicted with a preemption marking 202 in accordance with one embodiment of the invention. The preemption marking 202 indicates that a general promotion policy should not be enforced for the object and/or can be used to enforce a particular promotion policy for the object 122. As illustrated in FIG. 2B, the preemption marking 202 can, for example, be provided as a header 203 that is attached to data 204 of the object 122. Header 203 can, for example, be a one or two word header (32 or 64 bits) that, among other things, provides class information, blocking status and other information which typically needs to be provided for an object. Hence, the invention can easily be adapted in most computer systems and/or implemented without requiring a significant amount of additional resources if the preemption marking is provided as a header.

Figure 2C:
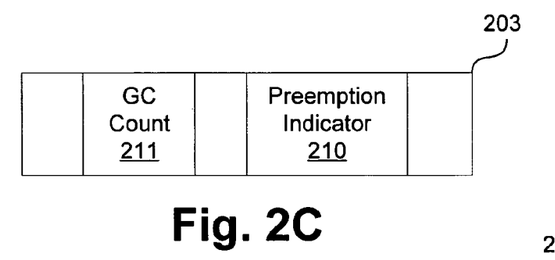

FIG. 2C depicts a header 203 in accordance with one embodiment of the invention. As shown in FIG. 2C, a preemption indicator 210 is provided in the header 203. The preemption indicator 210 may be implemented using one or more bits of the header 203. When the preemption indicator 210 is "on," a general promotion policy is ignored. In other words, the Garbage Collection (GC) count 211 is not used. In general, the GC count 211 is used to determine whether an object should be promoted. For example, the GC count can be initialized to a general promotion threshold (e.g., 4 garbage collection cycles) and decremented at each garbage collection cycle assuming that the object remains alive. The object is promoted when the GC count reaches zero. However, when the preemption indicator 210 is "on," the GC count is effectively ignored for that object. As a result, the object will never be promoted to the next generation.

Figure 2D:
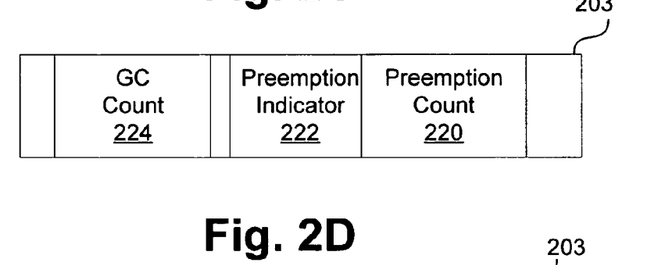

Other embodiments of the invention can be used to promote objects in accordance with a particular policy rather than preventing promotion per se. FIG. 2D depicts a header 203 in accordance with another embodiment of the invention. As shown in FIG. 2C, a preemption count 220 has been provided in addition to a preemption indictor 222 and GC count 224. Similar to the embodiment depicted in FIG. 2C, when the preemption indicator 222 is "on," general promotion policy for the object is ignored. In other words, the GC count 224 is not used to determine whether the object should be promoted. Instead, the preemption count 220 is used. The preemption count 220 can be greater or smaller than the GC count 224 used to enforce the general (or normal) preemption policy. As a result, promotion of an object may be delayed or expedited in accordance with a particular promotion policy that preempts the general promotion policy.

Figure 2E:
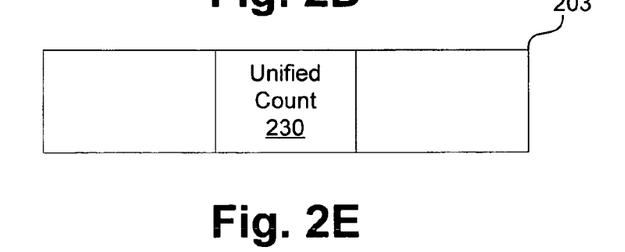

FIG. 2E depicts a header 203 in accordance with yet another embodiment of the invention. The header 203 provides a unified count 230. The unified count 230 represents a single value that is used to determine whether an object should be promoted. The unified count 230, can for example, be a garbage collection count that is allocated and used for all objects. The unified count 230, however, may be set in accordance with various promotion policies. By way of example, some objects can be allocated with a general unified count that is based on a general promotion policy while other objects are allocated with unified counts that differ from the general unified count. Typically, values that are greater than the general unified count are used to delay or avoid the promotion of objects. For example, a multiple of the general unified count can be used (e.g., 1.5, 2, 3, 4, 10, 100, or 1000 times, etc.). It should be noted that the unified promotion value can be set to a relatively high value (or a special value) that will effectively bar the promotion of an object. On the other hand, unified count may be selected to be a value that is less than the general promotion threshold (e.g. ¾, 0.5, ⅓, etc.) to effectively promote an object sooner than the general promotion threshold would.

FIG. 3A depicts a smart allocation system 102 in accordance with one embodiment of the invention. The smart allocation system 102 includes an allocation interface 302, a general memory allocator 304 and a preemptive memory allocator 306. As illustrated in FIG. 3A, various functions in code portions 308 and 310 can use the allocation interface 302 to allocate memory in a memory portion (e.g., memory portion 106 of FIG. 1). Moreover, these functions need only call a single interface, namely, the allocation interface 302. The allocation interface 302, however, may activate general memory allocator 304 or the preemptive memory allocator 306. As a result, different allocation policies can be enforced, which in turn, result in different promotion policies. In effect, the allocation interface 302 may be switched between the general memory allocator 304 and the preemptive memory allocator 306. This can, for example, be accomplished by providing a switch function that can be called to change the allocation policy.

By way of example, while a code portion 308 is being executed, the allocation interface 302 may be in position S1 and switched to the general memory allocation 304. This means that a general allocation policy can be enforced. As a result, objects allocated with the general allocator 304 will be promoted in accordance with a general policy. However, before the code portion 310 is executed, a switch function can be called to change the allocation policy. In effect, when the code portion 310 is executed, the allocation switch is moved from the S1 to S2 position to inactivate the general memory allocator 304 and activate the preemptive memory allocator 306. As a result, all functions in the code portion 310 will use the preemptive memory allocator 306 even though the same allocation interface 302 is used. Hence, a function that may be nested or called by another function in the code portion 310 will allocate memory using the preemptive memory allocator 306.

The switch in allocation policy may, for example, be made based on some external input or insight that indicates that it is likely that the object(s) being allocated will be garbage that can be collected and/or it is likely that a significant amount of objects that are garbage will be generated. One such example is system code that is run as part of the runtime environment. Unlike the application program code, system code is typically performed to provide a runtime environment that, among other things, supports execution of an application program rather than executing the application code itself. As such, system code typically generates temporary objects that will eventually be garbage. By way of example, class loading, parsing, and dynamic compilation that are performed in platform independent programming environments (e.g., Java™ programming environment) are operations that typically generate temporary objects that will eventually be garbage. Typically, all these operations are performed by system code. Therefore, during execution of system code, the allocation policy may be switched to the preemptive memory allocator 306 in accordance with one aspect of the invention. The allocation policy may be switched for different threads or based on different contexts of the same code. In general, the switch to the preemptive memory allocator 306 may be made for any context-specific code that allocates objects that are likely to become garbage or are likely to be mostly garbage.

Figure 3B:
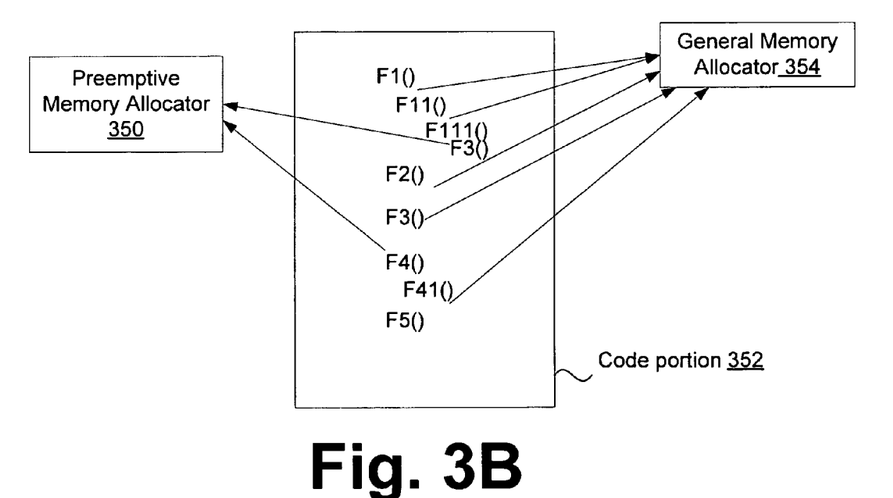
FIG. 3B illustrates a preemptive memory allocator that is directly accessed (e.g., called) by a function in a code portion in accordance with one embodiment of the invention.

In other cases, however, it may be desirable to have a particular function directly use the preemptive memory allocator 306. FIG. 3B illustrates a preemptive memory allocator 350 that is directly accessed (e.g., called) by a function in a code portion 352 in accordance with one embodiment of the invention. As shown in FIG. 3B, one or more functions in the code portion 352 may directly call the preemptive memory allocator 350 rather than a general memory allocator 354 that is used by other functions in the same code portion 352.

Direct access to the preemptive memory allocator 350 can be used, among other things, by library methods (or functions) used in a high-level programming language. By way of example, a library method can use the preemptive memory allocator 350 for concatenation of strings in Java™ programming language. This means that the "+" operator for string objects (used to indicate a concatenation operation) may be implemented to call, for example, a "StringBuffer.append-withLikelyGarbageAllocation," rather than the conventional "StringBuffer.append." As will be appreciated, operations like concatenations of strings in Java™ which are often used and are often likely to generate temporary data can directly access (e.g., call) the preemptive memory allocator 350.

Figure 4:
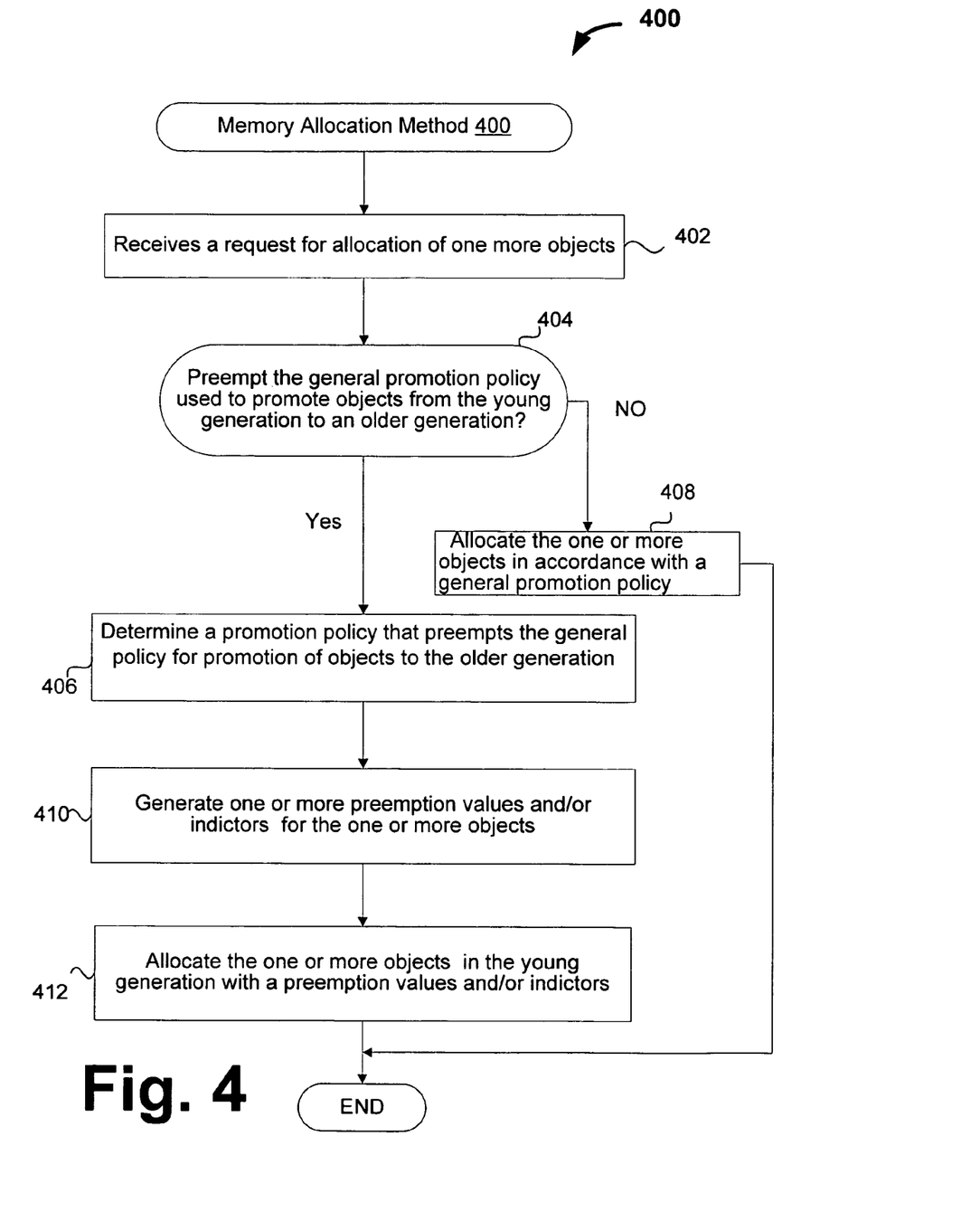
FIG. 4 depicts a memory allocation method for allocation of objects in memory that is partitioned into a plurality of generations in accordance with one embodiment of the invention.

FIG. 4 depicts a memory allocation method 400 for allocation of objects in a memory portion that is partitioned into a plurality of generations in accordance with one embodiment of the invention. The memory allocation method 400 can, for example, be used by the smart allocation system 102 (shown in FIG. 1) to allocate objects in memory 106 which have been partitioned into a Young Generation 108 and one or more Older Generations $OG_1, \ldots, OG_n$. The memory allocation method 400 initially receives 402 a request for allocation of one or more objects. Typically, the one or more objects are to be allocated in a Young Generation (e.g., Young Generation 108 of FIG. 1) portion of the memory (e.g., memory 106 of FIG. 1). Next, it is determined 404 whether a general promotion policy should be preempted. The general promotion policy is used for promotion of objects from the Young Generation to an Older Generation. By way of example, it can be determined whether the one or more objects are likely to become garbage or are likely to be mostly garbage. In other words, it can be determined whether the one or more objects are likely (e.g., more than 50% probable) to become garbage within an acceptable time frame (e.g., before the Young Generation runs out of space) or an acceptable number (e.g., more than half) of the objects are likely to become garbage. As noted above, this determination may easily be made, for example, in cases when system code or some library function that is likely to generate temporary objects (or data) are to be executed. In any case, when it is determined 404 that a general preemption policy should be preempted, a suitable promotion policy that preempts the general preemption policy is determined 406. Otherwise, one or more objects are allocated 408 in accordance with a general promotion policy and the memory allocation method 400 ends.

Typically, the preemption policy is determined 406 so that promotion of the one or more objects to the next generation of the memory is delayed. It should be noted that the one or more objects were determined 404 to be likely garbage or likely to be mostly garbage. As such, a reasonable promotion policy would be one that delays promotion beyond the general (normal) promotion time. By way of example, the general (normal) promotion policy may be to promote an object if it has survived four (4) garbage collection cycles. In this case, a reasonable preemption policy that is determined 406 above, may be to promote the one or more objects after five (5) or more garbage collection cycles (e.g., 6, 7, 8, 9, 10, 12, 20, 40, 50, 100, 1000, etc.). As will be appreciated, the preemption policy can be determined 406 based on system and/or application program requirements (e.g., memory space, speed, type of application).

Accordingly, one or more preemption values and/or indictors are generated 410 based on the promotion policy determined 406 for the one or more objects. The one or more preemption values and/or indictors are generated based on the preemption policy so that the general promotion policy can effectively be preempted for these objects. For example, a header can be generated in accordance with embodiments shown in FIG. 2C, FIG. 2D or FIG. 2E. It should be noted that if a unified preemption value is used (shown in FIG. 2E), only the unified count needs to be initialized. By way of example, the unified count can be set to a value that indicates the number of garbage collection cycles that the object needs to survive before it is promoted. After the generation 410 of the one or more preemption values and/or indicators, each one of the one or more objects are allocated 412 in the Young Generation with a preemption values and/or indicators. The memory allocation method 400 ends following operation 412.

Figure 5:
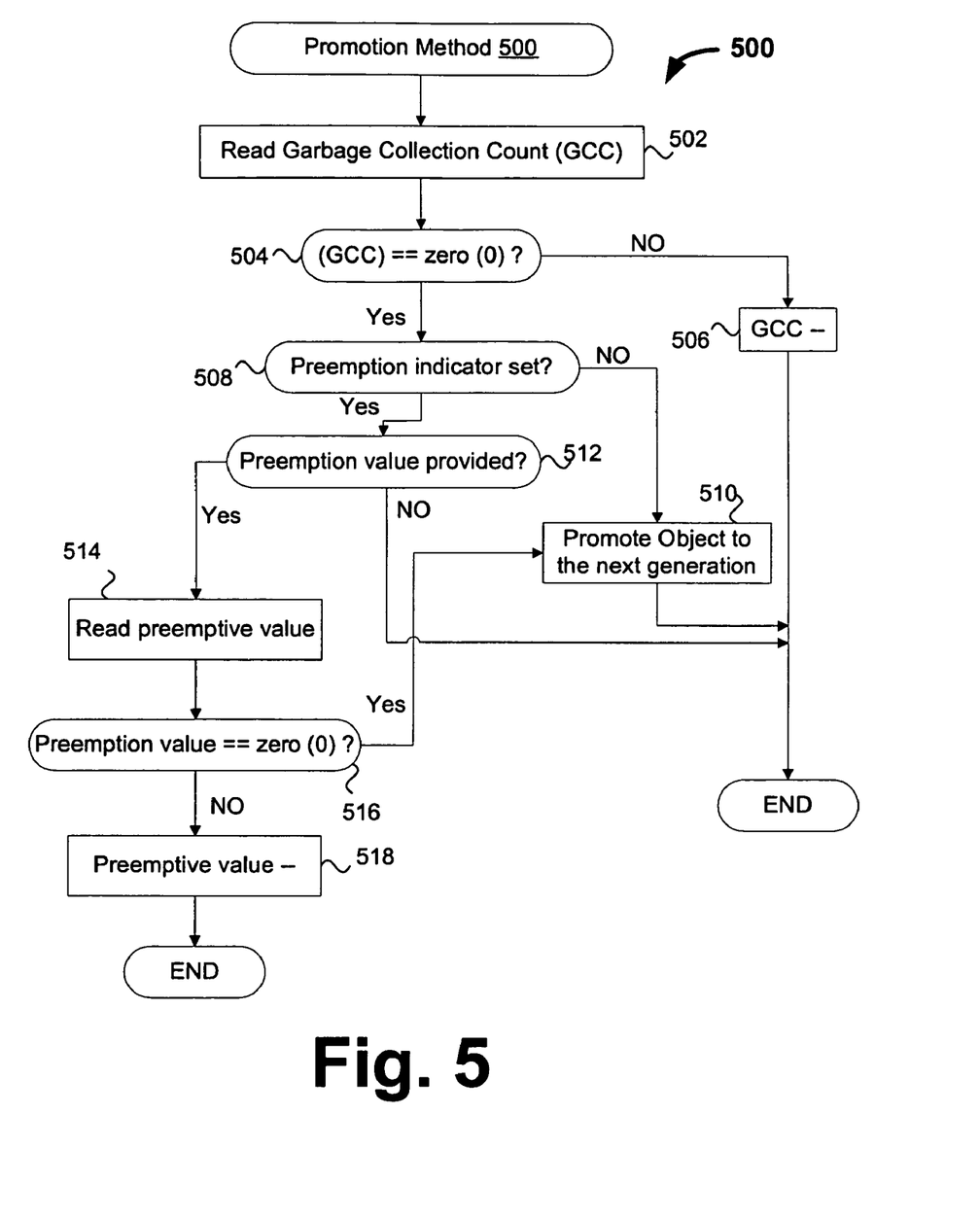
FIG. 5 depicts a promotion method for promoting a live object which has been allocated in one generation to the next generation of a memory portion in accordance with one embodiment of the invention

FIG. 5 depicts a promotion method 500 for promoting a live object which has been allocated in one generation to the next generation of a memory portion in accordance with one embodiment of the invention. Typically, the object promotion method 500 is performed at each garbage collection cycle of a generational garbage collection scheme. During each garbage collection cycle, objects that may still be used (are alive) are examined to determine whether they should be promoted from the Young Generation to the next generation. To provide a more comprehensive demonstration, the object promotion method 500 illustrates a promotion method that can be used for various header embodiments shown in FIGS. 2C, 2D and 2E. However, it should be noted that it is possible to use a different promotion method for each of these embodiments. As such, a subset of the operations may be used, for example, in cases when only one of the header types is used.

Initially, a Garbage Collection Count (GCC) is read 502 for the object. The Garbage Collection Count is a positive integer which has been initialized for the object when the object was allocated. The Garbage Collection Count (GCC) reflects the promotion policy that has been selected for the object. In this example, larger integer values, correspond to longer waiting periods.

After the Garbage Collection Count (GCC) is read 502, it is determined 504 whether a Garbage Collection Count (GCC), is equal to zero (0). If it is determined 504 that the Garbage Collection Count (GCC) is greater than zero, the value of the Garbage Collection Count (GCC) is decreased 506, by one and the object promotion method 500 ends. It should be noted that for the embodiment shown in FIG. 2E, the unified county may be considered to be the Garbage Collection Count (GCC). Thus, when it is determined 504 that the GCC is greater than zero, GCC is decreased 506 by one and the object promotion method 500 ends.

However, if it is determined 504 that the Garbage Collection Count (GCC) is equal to zero (0), it is determined 508 whether a preemption indicator (e.g., preemption indicator 222 of FIG. 2D) is set (e.g., "on"). If it is determined 508 that a preemption indicator is not set, the object is promoted 510 to the next generation and the promotion method 500 ends. Again, it should be noted that when a unified count is used, the object is promoted when the value of the unified count reaches zero.

On the other hand, if it is determined 508 that a preemption indicator is set, it is determined 512 whether a preemption value (e.g., 220 of FIG. 2D) has been provided. If it is determined 512 a preemption value has not been provided, the object promotion method 500 ends. In other words, the object is not promoted to the next generation even though the GCC count is zero. In effect, the GCC is ignored when the preemptive indicator is set, but no preemptive value has been provided (e.g., header 203 shown in FIG. 2C). However, when it is determined 512 that a preemption value has been provided, the preemptive value is read 514. Accordingly, it is determined 516 whether the preemptive value is equal to zero. If the preemptive value is greater than zero, it is decreased 518 by one and the object promotion method 500 ends. It should be noted that the object is not promoted to the next generation until it is determined 516 that the preemptive value is equal to zero. Accordingly, if determined 516 that the preemptive value is equal to zero, the object is promoted 510 to the next generation, and the object promotion method 500 ends.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method in a data processing system having a program for allocating objects in a memory portion that includes a Young Generation and at least one Older Generation, said method comprising:
   (a) for each of the objects, determining whether at least one object should be allocated in said Young Generation in accordance with a first promotion policy exercised for promoting objects from said Young Generation to an Older Generation of said memory portion;
   (b) based on the determining whether each of the objects should be allocated using the first promotion policy, determining whether said at least one object should be allocated in said Young Generation in accordance with a second promotion policy exercised for at least postponing promoting objects from said Young Generation to said Older Generation relative to the first promotion policy, wherein the determination includes at least evaluating the characteristics of each of the objects of the set of objects to determine a likelihood that each object will become garbage within a predetermined number of garbage collection cycles, and wherein the objects to which the second promotion policy is applied are not evaluated in accordance with the first promotion policy; and
   (c) storing each of the objects in said Young Generation in accordance with said first or second promotion policy and providing an indication of said second promotion policy in a header for a subset of the objects, the indication used during a promoting step to preempt use of the first promotion policy.

2. The method as recited in claim 1, wherein said determining (a) of whether at least one object should be allocated in accordance with a first promotion policy comprises:
   determining whether said at least one object is used as temporary data.

3. The method as recited in claim 2, wherein said determining (a) of whether at least one object should be allocated in accordance with a first promotion policy comprises:
   determining whether said at least one object is garbage.

4. The method as recited in claim 3, wherein said at least one object can be garbage within an acceptable time period.

5. The method as recited in claim 1, wherein said determining (a) of whether at least one object should be allocated in accordance with a first promotional policy comprises:
   determining whether said at least one object is garbage.

6. The method as recited in claim 5, wherein said determining of whether said at least one object is garbage determines whether at least 50% of said at least one object is garbage.

7. The method as recited in claim 1, wherein said determining (a) of whether an object should be allocated in accordance with a first promotion policy comprises:
   determining whether system code is allocating said object; and
   wherein said method further comprises:
   selecting a second promotion policy that postpones the promotion of said at least one object with respect to other objects allocated in accordance with said first promotion policy.

8. The method as recited in claim 1, wherein said determining (a) of whether an object should be allocated in accordance with a first promotion policy comprises:
   determining whether one or more of the following operations are being performed: loading a class, parsing a file that represents a class, dynamic compilation, and a call to a library function that generates temporary data.

9. The method as recited in claim 8, wherein said class is Java™ compliant class represented in a class file, said dynamic compilations are performed in Java™ compliant run time environment, and said library function is Java™ compliant library method.

10. The method as recited in claim 9, wherein said Java™ compliant library method is associated with concatenation of Java™ strings.

11. The method as recited in claim 1, wherein said header includes a preemption indicator that indicates a garbage collection count should be preempted and said at least one object should not be promoted to said next generation.

12. The method as recited in claim 1, wherein said header includes a preemption indicator and a preemption value;
   wherein said preemption indicator indicates that a garbage collection count should be preempted;
   wherein said preemption value provides a preemptive garbage collection count that is used instead of a garbage collection count.

13. The method as recited in claim 1, wherein said header provides a garbage collection count to determine when said at least one object should be promoted from said Young Generation to said Older Generation.

14. A computer system, comprising:
   at least one processing unit;
   a memory portion that is partitioned into a Young Generation and at least one Older Generation;
   a first memory allocator that operates to allocate one or more objects in said Young Generation in accordance with a first promotion policy for promoting said one or more objects from said Young Generation to an Older Generation in said memory; and
   a second memory allocator that operates to allocate one or more other objects in said Young Generation in accordance with a second promotion policy for at least postponing promoting said one or more other objects from said Young Generation to an Older Generation in said memory relative to the promoting performed in accordance with the first promotion policy wherein the determination to allocate the objects in accordance with the second promotion policy includes at least evaluating the characteristics of each of the objects of the set of objects to determine a likelihood that each object will become garbage within a predetermined number of garbage collection cycles, and wherein the objects to which the second promotion policy is applied are not evaluated in accordance with the first promotion policy, and, wherein the one or more other objects are being allocated by system code or are associated with an operation predefined as likely to generate garbage.

15. The computer system as recited in claim 14, wherein said system further comprises:
an allocation interface that can be used to access both said first and second memory allocators,
wherein,
said allocation interface operates to use said first or second memory allocators in accordance with an allocation selection, and
an allocation switching function that can be used to switch said allocation selection from said first memory allocator to said second memory allocator.

16. The computer system as recited in claim 14, wherein said first and second memory allocators can be directly accessed.

17. The computer system as recited in claim 14, wherein said processing unit:
determines whether at least one object should not be allocated using said first memory allocator in said Young Generation in accordance with said first promotion; and
determines said second promotion policy used by said second allocator when it is determined that at least one object should not be allocated in said Young Generation in accordance with said first promotion.

18. The computer system as recited in claim 14, wherein said second allocator allocates at least one object with a header that indicates said second promotion policy.

19. The computer system as recited in claim 18, further comprising:
a garbage collector that reads said header and promotes said at least one object in accordance with said header.

20. The computer system as recited in claim 19, wherein said garbage collector delays or avoids promotion of said at least one object with respect to objects allocated with said first allocator.

21. The computer system as recited in claim 14, wherein said header includes a preemption indicator indicating that a garbage collection count should be preempted and said at least one object should not be promoted to said next generation.

22. The computer system as recited in claim 21, wherein said header includes a preemption indicator and a preemption value;
said preemption indicator indicates that a garbage collection count should be preempted; and
said preemption value provides a preemptive garbage collection count that is used instead of said garbage collection count.

23. The computer system as recited in claim 21, wherein said header provides a garbage collection count that is used to determine when said at least one object should be promoted from Young Generation to said Older Generation.

24. The computer system as recited in claim 14, wherein said computer system is a virtual machine.

25. The computer system as recited in claim 14, wherein said computer system is a Java™ compliant virtual machine.

26. The computer system as recited in claim 14, wherein said computer system is provided for a handheld, an embedded, or mobile device.

27. A computer readable storage medium including computer program code for allocating objects in a memory portion that includes a Young Generation and at least one Older Generation, said computer readable medium including comprising:

computer program code for allocating one or more objects in said Young Generation in accordance with a first promotion policy exercised for promoting objects from said Young Generation to an Older Generation of said memory portion; and
computer program code for allocating one or more other objects in said Young Generation in accordance with a second promotion policy exercised for postponing or cancelling promoting objects form said Young Generation to an Older Generation of said memory portion wherein the determination to allocate the objects in accordance with the second promotion policy includes at least evaluating the characteristics of each of the objects of the set of objects to determine a likelihood that each object will become garbage within a predetermined number of garbage collection cycles, and wherein the objects to which the second promotion policy is applied are not evaluated in accordance with the first promotion policy, and,
wherein,
each of said one or more objects includes a header that indicates said second promotion policy.

28. The computer readable medium as recited in claim 27, wherein said second promotion policy is not to promote said one or more objects from said Young Generation to said Older Generation of said memory portion.

29. The computer readable medium as recited in claim 27, wherein said second promotion policy is to delay the promotion of said one or more other objects with respect to objects allocated under said first promotion policy.

30. A computer readable storage medium including computer program code for allocating objects in a memory portion that includes a Young Generation and at least one Older Generation, said computer readable medium including comprising:
computer program code for allocating all of the objects into said Young Generation in accordance with either a first promotion policy exercised for promoting objects from said Young Generation to an Older Generation of said memory portion or a second promotion policy exercised for promoting objects from said Young Generation to an Older Generation of said memory portion, wherein the second promotion policy defines a longer tenure for the objects in the Young Generation than the first promotion policy, wherein the determination to allocate the objects in accordance with the second promotion policy includes at least evaluating the characteristics of each of the objects of the set of objects to determine a likelihood that each object will become garbage within a predetermined number of garbage collection cycles, and wherein the objects to which the second promotion policy is applied are not evaluated in accordance with the first promotion policy; and
computer program code for promoting live ones of the objects allocated in the Young Generation to the Older Generation, the promoting being performed for each object involving first determining whether the object was allocated using the first or the second promotion policy and second applying the determined one of the first and second promotion policies.

31. The computer readable medium as recited in claim 30, wherein said first promotion policy comprises assigning a value to a garbage collection count and wherein said second promotion policy comprises assigning a pre-emptive count value to the object that defines the longer tenure for the object in the Young Generation.

* * * * *